United States Patent
Meardi et al.

(10) Patent No.: US 12,413,767 B2
(45) Date of Patent: Sep. 9, 2025

(54) TEMPORAL PROCESSING FOR VIDEO CODING TECHNOLOGY

(71) Applicant: V-NOVA INTERNATIONAL LIMITED, London (GB)

(72) Inventors: Guido Meardi, London (GB); Ivan Damnjanovic, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 17/439,564

(22) PCT Filed: Mar. 18, 2020

(86) PCT No.: PCT/GB2020/050693
§ 371 (c)(1),
(2) Date: Sep. 15, 2021

(87) PCT Pub. No.: WO2020/188272
PCT Pub. Date: Sep. 24, 2020

(65) Prior Publication Data
US 2022/0159289 A1    May 19, 2022

(30) Foreign Application Priority Data

Mar. 20, 2019    (GB) ..................................... 1903844
Mar. 23, 2019    (GB) ..................................... 1904014
(Continued)

(51) Int. Cl.
*H04N 19/503*    (2014.01)
*H04N 19/109*    (2014.01)
(Continued)

(52) U.S. Cl.
CPC ......... *H04N 19/503* (2014.11); *H04N 19/109* (2014.11); *H04N 19/117* (2014.11);
(Continued)

(58) Field of Classification Search
CPC .. H04N 19/109; H04N 19/117; H04N 19/122; H04N 19/124; H04N 19/13;
(Continued)

(56) References Cited

U.S. PATENT DOCUMENTS

| | | |
|---|---|---|
| 8,964,854 B2 | 2/2015 | Tu et al. |
| 2003/0067637 A1 | 4/2003 | Hannuksela |

(Continued)

FOREIGN PATENT DOCUMENTS

| | | |
|---|---|---|
| CN | 104813660 A | 7/2015 |
| CN | 106464891 A | 2/2017 |

(Continued)

OTHER PUBLICATIONS

Heiko Schwarz, et al., "Chapter 3: Block Structures and Parallelism Features in HEVC", In: "High Efficiency Video Coding (HEVC)", Aug. 23, 2014, Springer International Publishing, XP055614176, ISBN: 978-3-319-06894-7, pp. 49-90, DOI: 10.1007/978-3-319-06895-4_3, section 3.3.2.

(Continued)

*Primary Examiner* — Shahan Ur Rahaman
(74) *Attorney, Agent, or Firm* — Workman Nydegger

(57) ABSTRACT

A decoder (400) configured to receive a first output video and one or more further encoded streams (416, 428), decode respective frames of the one or more further encoded streams to derive respective sets of residuals; and combine (470) the sets of residuals with the first output video to generate a reconstructed output video (448). Each frame is divided into a plurality of tiles and each tile is divided into a plurality of blocks. To decode respective frames, the decoder is configured to obtain (440, 446) a preliminary set of residuals from the one or more further encoded streams, derive a set of temporal predictions using a temporal buffer (432), and combine (468) the set of temporal predictions (Continued)

with the preliminary set of residuals. The decoder is configured to provide for zeroing of values of the set of temporal predictions at a frame level, at a tile level and at a block level.

15 Claims, 6 Drawing Sheets

(30) Foreign Application Priority Data

Mar. 29, 2019 (GB) ...................................... 1904492
Apr. 15, 2019 (GB) ...................................... 1905325

(51) Int. Cl.
| | |
|---|---|
| H04N 19/117 | (2014.01) |
| H04N 19/122 | (2014.01) |
| H04N 19/124 | (2014.01) |
| H04N 19/13 | (2014.01) |
| H04N 19/132 | (2014.01) |
| H04N 19/136 | (2014.01) |
| H04N 19/172 | (2014.01) |
| H04N 19/176 | (2014.01) |
| H04N 19/177 | (2014.01) |
| H04N 19/18 | (2014.01) |
| H04N 19/184 | (2014.01) |
| H04N 19/30 | (2014.01) |
| H04N 19/44 | (2014.01) |
| H04N 19/60 | (2014.01) |
| H04N 19/82 | (2014.01) |

(52) U.S. Cl.
CPC ......... *H04N 19/122* (2014.11); *H04N 19/124* (2014.11); *H04N 19/13* (2014.11); *H04N 19/132* (2014.11); *H04N 19/136* (2014.11); *H04N 19/172* (2014.11); *H04N 19/176* (2014.11); *H04N 19/177* (2014.11); *H04N 19/18* (2014.11); *H04N 19/184* (2014.11); *H04N 19/30* (2014.11); *H04N 19/45* (2014.11); *H04N 19/60* (2014.11); *H04N 19/82* (2014.11)

(58) Field of Classification Search
CPC .. H04N 19/132; H04N 19/136; H04N 19/172; H04N 19/176; H04N 19/177; H04N 19/18; H04N 19/184; H04N 19/30; H04N 19/33; H04N 19/36; H04N 19/45; H04N 19/46; H04N 19/503; H04N 19/59; H04N 19/60; H04N 19/80; H04N 19/82
See application file for complete search history.

(56) References Cited

U.S. PATENT DOCUMENTS

| | | | |
|---|---|---|---|
| 2004/0042549 A1 | 3/2004 | Huang et al. | |
| 2004/0218816 A1 | 11/2004 | Hannuksela | |
| 2008/0304566 A1 | 12/2008 | Yoon | |
| 2009/0122877 A1* | 5/2009 | Haskell | H04N 19/61 375/E7.2 |
| 2011/0261888 A1 | 10/2011 | Cammas et al. | |
| 2012/0183076 A1 | 7/2012 | Boyce | |
| 2013/0044813 A1 | 2/2013 | Boon | |
| 2013/0272406 A1 | 10/2013 | Yu | |
| 2014/0219346 A1 | 8/2014 | Ugur | |
| 2015/0195549 A1 | 7/2015 | Wang | |
| 2015/0264404 A1 | 9/2015 | Hannuksela | |
| 2017/0127085 A1 | 5/2017 | Sun et al. | |
| 2017/0256033 A1 | 9/2017 | Tuzel et al. | |
| 2019/0208222 A1 | 7/2019 | Ugur et al. | |
| 2021/0409691 A1* | 12/2021 | Hendry | H04N 19/14 |
| 2022/0400270 A1 | 12/2022 | Meardi et al. | |

FOREIGN PATENT DOCUMENTS

| | | | |
|---|---|---|---|
| EP | 2090108 | 6/2013 | |
| GB | 2552353 A | 1/2018 | |
| GB | 2553556 | 3/2018 | |
| GB | 2553556 A * | 3/2018 | .......... H04N 19/166 |
| GB | 2599507 A | 4/2022 | |
| JP | H11289542 | 10/1999 | |
| JP | 2014132759 | 7/2014 | |
| WO | 03/36979 A1 | 5/2003 | |

OTHER PUBLICATIONS

International Search Report and Written Opinion for PCT/GB2020/050693 dated Jun. 9, 2020.
Video: Text of ISO/IEC CD 23094-2, Low Complexity Enhancement Video Coding 11, ITU-T Draft; Study Period 2017-2020; Study Group 16, International Telecommunication Union, Geneva, CH, vol. ties/16, Jan. 13, 2020 (Jan. 13, 2020), pp. 1-96, XP044281530, Retrieved from the Internet: URL: https://www.itu/int/ifa/t/2017/sg16/docs/200622/td/ties/gen/T17-SG16-200622-TD-GEN-0444lA2lZIP-E.zip, NI8777%20-%20CD 20191105%20-%20v.2.0.docx [retrieved on Jan. 13, 2020].
Ciccarelli L et al: "[LCEVC]—Corrections for Working Draft", 127. MPEG Meeting; Jul. 8, 2019-Jul. 12, 2019; Gothenburg; (Motion Picture Expert Group or ISO/IEC JTC1/SC29/WG11), No. m49256, Jul. 6, 2019 (Jul. 6, 2019), XP030207551, Retrieved from the Internet: URL:http://phenix.int-evry.fr/mpeg/doc_end_user/documents/127_Gothenburg/wgll/m49256-v2-m49256-[LCEVC]-CorrectionsforWorkingDraft-v.2.zip, Corrected WD.docx [retrieved on Jul. 6, 2019].
"Description of video coding technology proposal by V-Nova for Low Complexity Video Coding Enhancements", 126. MPEG Meeting; Mar. 25, 2019-Mar. 29, 2019; Geneva; (Motion Picture Expert Group or ISO/IEC JTC1/SC29/WG11), No. m47215, Mar. 24, 2019 (Mar. 24, 2019), XP030211099, Retrieved from the Internet: URL:http://phenix.int-evry.fr/mpeg/doc_end_user/documents/126_Geneva/wgll/m47215-v4-m47215-v4.zip, V-Nova—Description of proposal.pptx [retrieved on Mar. 24, 2019].
Ferrara S et al: "[LCEVC]—CE2 Report", 127. MPEG Meeting; Jul. 8, 2019-Jul. 12, 2019; Gothenburg; (Motion Picture Expert Group or ISO/IEC JTC1/SC29/WG11), No. m49254, Jul. 6, 2019 (Jul. 6, 2019), XP030207546, Retrieved from the Internet: URL:http:/phenix.int-evry.fr/mpeg/doc_end_user/documents/127_Gothenburg/wgll/m49254-v2-m49254-[LCEVC]-CoreExperiment2-v.2.zip, m49254—Core Experiment 2—v.2.docx [retrieved on Jul. 6, 2019].
Search and Examination Report for GB2312636.0 dated Sep. 28, 2023.
GB2312647.7 Search and Examination Report dated Sep. 7, 2023.
GB2312674.1 Search and Examination Report dated Oct. 10, 2023.
GB2312680.8 Search Report dated Oct. 5, 2023.
PCT/GB2020/050693 International Preliminary Report on Patentability dated Sep. 30, 2021, 12 pages.
GB2312675.8 Search & Exam report dated Sep. 12, 2023.
GB2312670.9 Search & Exam report dated Sep. 12, 2023.
JP2021558488 Office Action Mar. 4, 2024 14 pages (8 pages of English Translation and 6 pages of Original Document).
Office Action received for Australia Patent Application No. 2020244264, mailed on Nov. 28, 2024, 2 pages.
Office Action received for EA Patent Application No. 202192481, mailed on Dec. 20, 2022, 14 pages (2 pages of English Translation and 12 pages of Original Document).
Office Action received for EA Patent Application No. 202192481, mailed on Jul. 24, 2023, 18 pages (9 pages of English Translation and 9 pages of Original Document).
Office Action received for GB Patent Application No. 2114967.9, mailed on Aug. 23, 2022, 2 pages.
Office Action received for GB Patent Application No. 2114967.9, mailed on Mar. 21, 2023, 3 pages.

(56) References Cited

OTHER PUBLICATIONS

Office Action received for Indian Patent Application No. 202127047478, mailed on Feb. 20, 2023, 7 pages.
Office Action received for Canada Patent Application No. 3133943, mailed on Mar. 19, 2025, 5 pages.

* cited by examiner

TEMPORAL PROCESSING FOR VIDEO CODING TECHNOLOGY

CROSS-REFERENCE TO RELATED APPLICATIONS

The present application is a 371 US Nationalization of International Patent Application No. PCT/GB2020/050693, filed Mar. 18, 2020, which claims priority to UK Patent Application Nos. 1903844.7, filed Mar. 20, 2019, 1904014.6, filed Mar. 23, 2019, 1904492.4, filed Mar. 29, 2019, and 1905325.5, filed Apr. 15, 2019, the entire disclosures of which are incorporated herein by reference.

TECHNICAL FIELD

The present invention relates to methods, apparatuses, computer programs and computer readable media for use in video coding technology.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the ability of the encoder and/or the decoder to process information efficiently. The efficiency with which the encoder and/or the decoder processes information may be a factor in the performance level of the encoder and/or the decoder.

SUMMARY

Various aspects of the present invention are set out in the appended claims.

Further features and advantages will become apparent from the following description, given by way of example only, which is made with reference to the accompanying drawings.

DETAILED DESCRIPTION

Described herein is a hybrid backward-compatible coding technology.

The examples described herein provide a flexible, adaptable, highly efficient and computationally inexpensive coding format which combines a different video coding format, a base codec, (e.g. AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including over-the-top (OTT) transmission, live streaming, live ultra-high definition (UHD) broadcast, and so on.

Although the decoded output of the base codec is not intended for viewing, it is a fully decoded video at a lower resolution, making the output compatible with existing decoders and, where considered suitable, also usable as a lower resolution output.

The codec format uses a minimum number of simple coding tools. When combined synergistically, they can provide visual quality improvements when compared with a full resolution picture encoded with the base codec whilst at the same time generating flexibility in the way they can be used.

Figure 1:
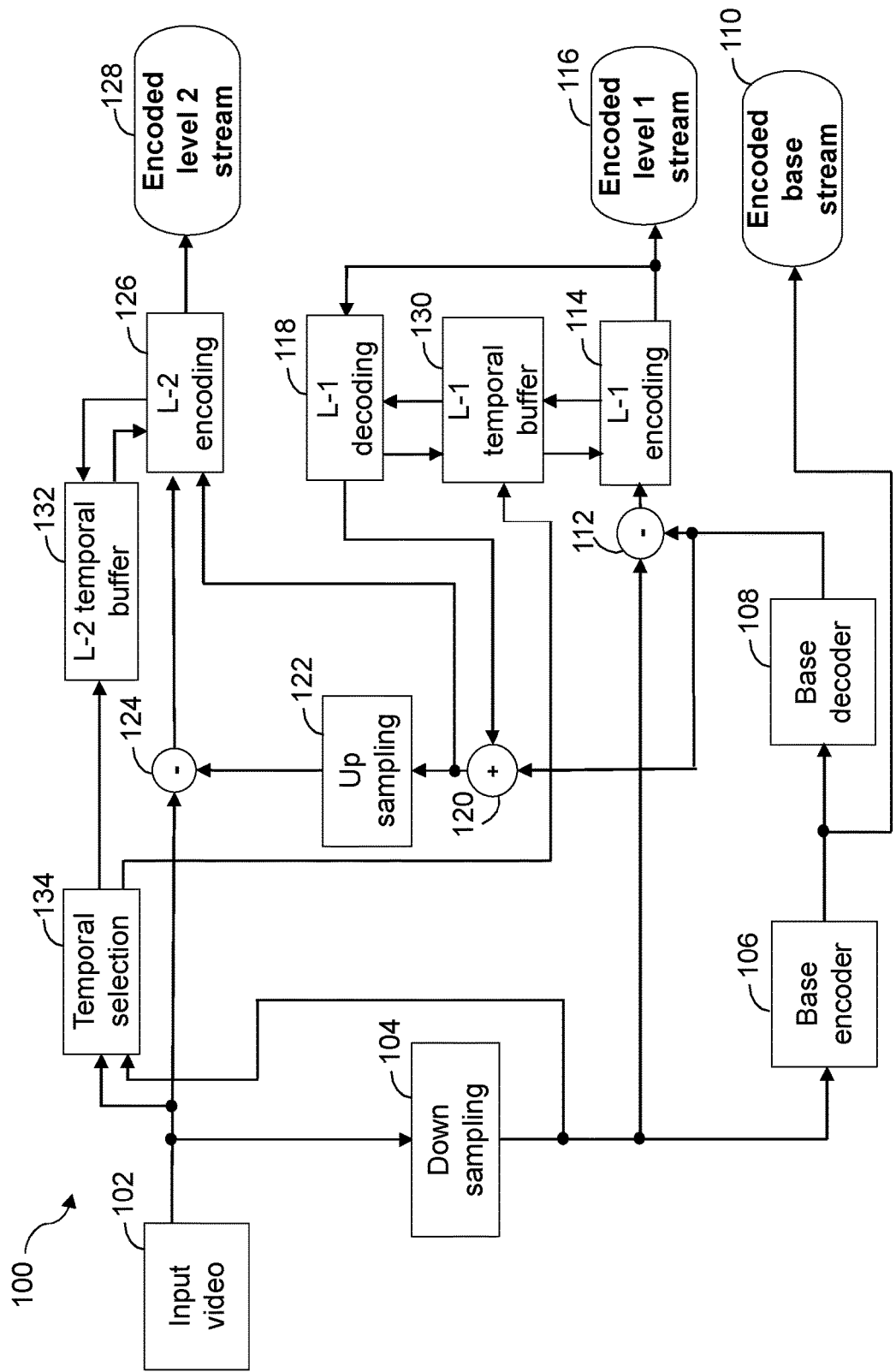
FIG. 1 is a schematic diagram illustrating an encoding process according to examples herein.

FIG. 1 shows a first example encoder 100. The illustrated components may also be implemented as steps of a corresponding encoding process.

In the encoder 100, an input full resolution video 102 is processed to generate various encoded streams. A first encoded stream (encoded base stream 110) is produced by feeding a base encoder 106 (e.g., AVC, HEVC, or any other codec) with a down-sampled version of the input video, which is produced by down-sampling 104 the input video 102. A second encoded stream (encoded level 1 stream 116) is produced by applying an encoding operation 114 to the residuals obtained by taking the difference 112 between the reconstructed base codec video and the down-sampled version of the input video. The reconstructed base codec video is obtained by decoding the output of the base encoder 106 with a base decoder 108. A third encoded stream (encoded level 2 stream 128) is produced by processing 126 the residuals obtained by taking the difference 124 between an up-sampled version of a corrected version of the reconstructed base coded video and the input video 102. The corrected version of the reconstructed base codec video is obtained by combining 120 the reconstructed base codec video and the residuals obtained by applying a decoding operation 118 to the encoded level 1 stream 116.

The level 1 encoding operation 114 operates with an optional level 1 temporal buffer 130, which may be used to apply temporal processing as described further below. The level 2 encoding operation 126 also operates with an optional level 2 temporal buffer 132, which may be used to apply temporal processing as described further below. The level 1 temporal buffer 130 and the level 2 temporal buffer 132 may operate under the control of a temporal selection component 134. The temporal selection component 134 may receive one or more of the input video 102 and the output of the down-sampling 104 to select a temporal mode. This is explained in more detail in later examples.

Figure 2:
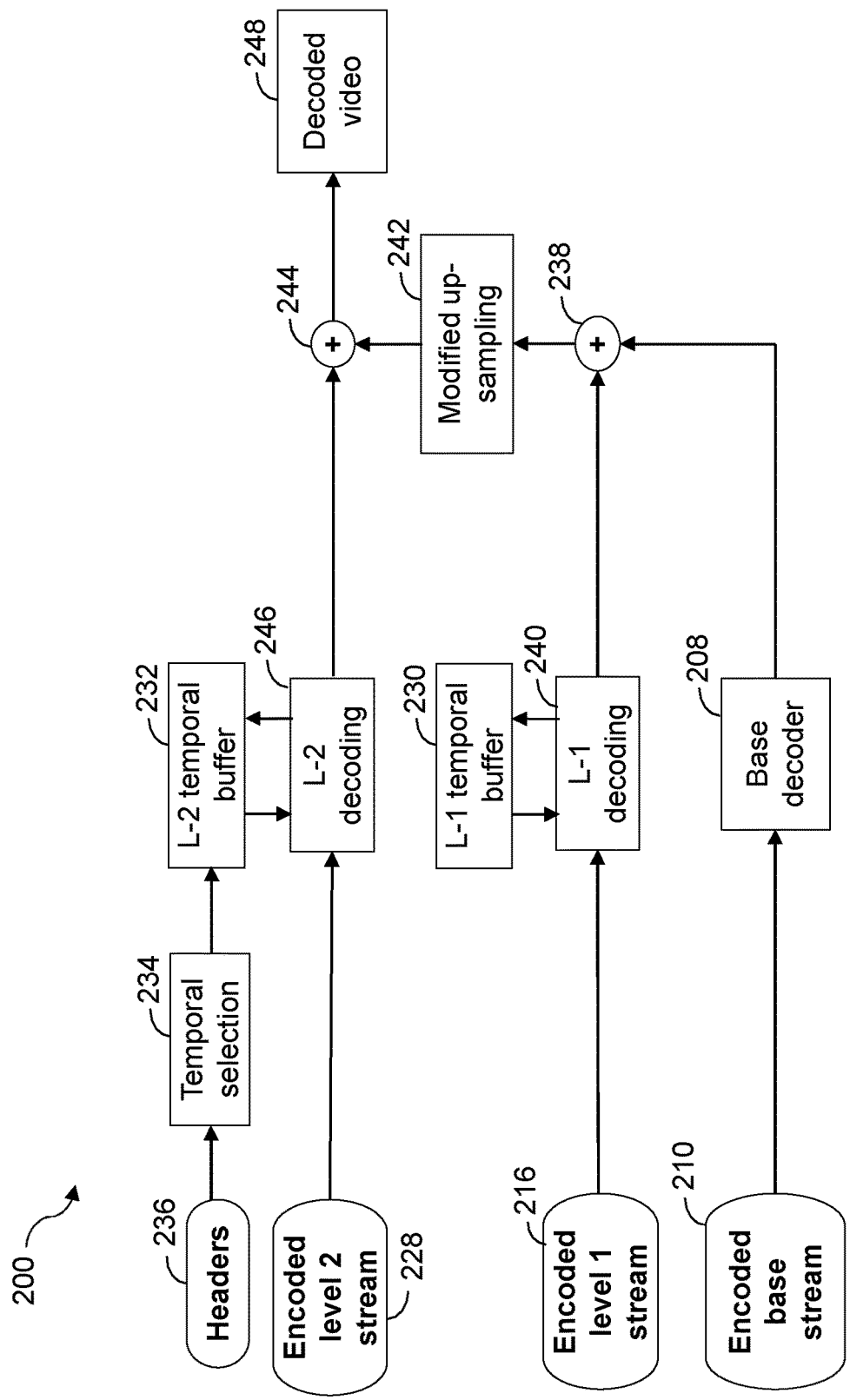
FIG. 2 is a schematic diagram illustrating a decoding process according to examples herein.

FIG. 2 shows a first example decoder 200. The illustrated components may also be implemented as steps of a corresponding decoding process. The decoder receives the three streams (an encoded base stream 210, an encoded level 1 stream 216 and an encoded level 2 stream 228) generated by an encoder such as the encoder 100 of FIG. 1 together with headers 236 containing further decoding information. The encoded base stream 210 is decoded by a base decoder 208 corresponding to the base decoder used in the encoder, and its output is combined 238 with the decoded residuals obtained by decoding 240 the encoded level 1 stream 216. The combined video is up-sampled 242 and further combined 244 with the decoded residuals obtained by applying a decoding operation 246 to the encoded level 2 stream 228.

Figure 3A:
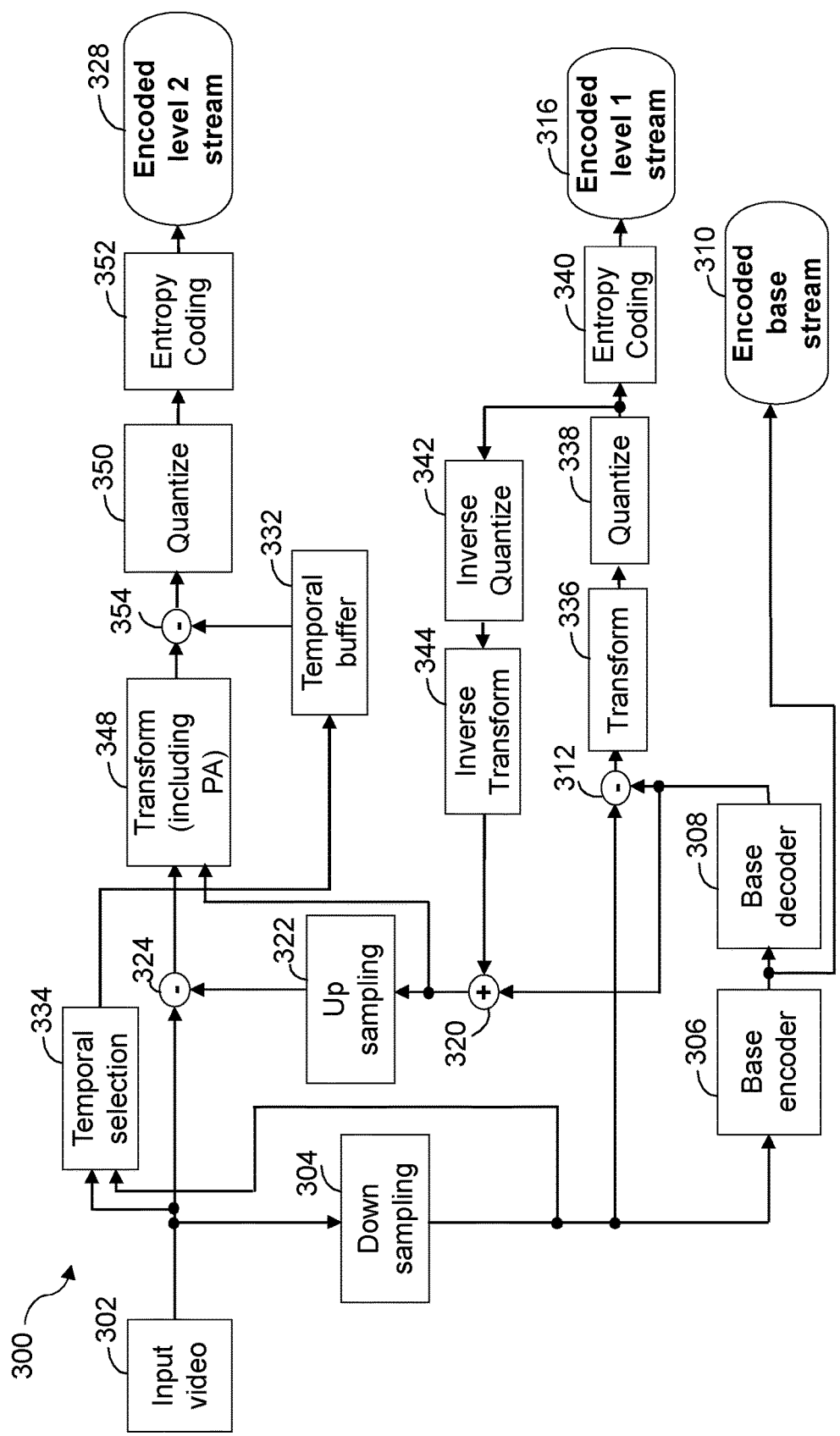
FIGS. 3A and 3B are schematic diagrams each illustrating an encoding process according to examples herein.
Figure 3B:
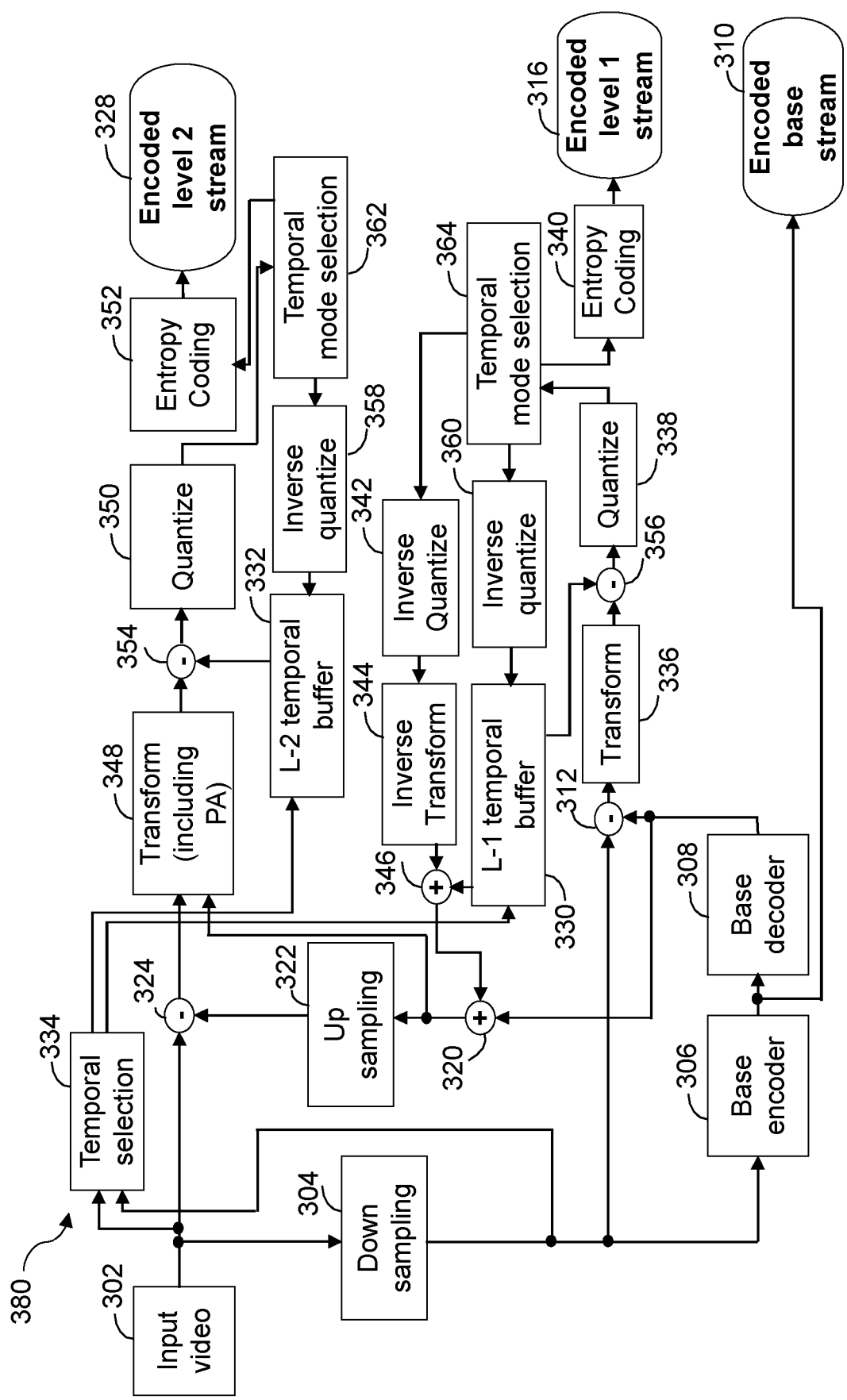

FIGS. 3A and 3B show different variations of a second example encoder 300, 380. The second example encoder 300, 380 may comprise an implementation of the first example encoder 100 of FIG. 1. In the examples of FIGS. 3A and 3B, the encoding steps of the stream are expanded in more detail to provide an example of how the steps may be performed. FIG. 3A illustrates a first variation with temporal prediction provided only in the second level of the enhancement process, i.e. with respect to the level 2 encoding. FIG. 3B illustrates a second variation with temporal prediction performed in both levels of enhancement (i.e. levels 1 and 2).

The base stream 310 is substantially created by a process as explained with reference to FIG. 1. That is, an input video 302 is down-sampled 304 (i.e. a down-sampling operation 304 is applied to the input video 302 to generate a down-sampled input video). The down-sampled video obtained by down-sampling 304 the input video 302 is then encoded using a first base encoder 306 (i.e. an encoding operation is applied to the down-sampled input video to generate an encoded base stream 310 using a first or base encoder 306). Preferably the first or base encoder 306 is a codec suitable for hardware decoding. The encoded base stream 310 may be referred to as the base layer or base level.

As noted above, the enhancement stream may comprise two streams. A first level of enhancement (described herein as "level 1") provides for a set of correction data which can be combined with a decoded version of the base stream to generate a corrected picture. This first enhancement stream is illustrated in FIGS. 1 and 3 as the encoded Level 1 stream 316. The enhancement stream may be generated by an enhancement encoder. The enhancement encoder may be different to the base encoder 306 used to generate the encoded base stream 310.

To generate the encoded Level 1 stream 316, the encoded base stream 310 is decoded using a base decoder 308 (i.e. a decoding operation is applied to the encoded base stream 310 to generate a decoded base stream). The difference 312 between the decoded base stream and the down-sampled input video obtained by down-sampling 304 the input video 302 is then created (i.e. a subtraction operation 312 is applied to the down-sampled input video and the decoded base stream to generate a first set of residuals). Here the term residuals is used in the same manner as that known in the art, that is, the error between a reference frame and a desired frame. Here the reference frame is the decoded base stream and the desired frame is the down-sampled input video. Thus the residuals used in the first enhancement level can be considered as a corrected video as they 'correct' the decoded base stream to the down-sampled input video that was used in the base encoding operation.

The difference 312 is then encoded to generate the encoded Level 1 stream 316 (i.e. an encoding operation is applied to the first set of residuals to generate a first enhancement stream 316).

In the example implementation of FIGS. 3A and 3B, the encoding operation comprises several steps, each of which is optional and preferred and provides particular benefits.

In FIG. 3, the steps include a transform step 336, a quantization step 338 and an entropy encoding step 340.

Although not shown in the Figures, in some examples, the encoding process identifies if the residuals ranking mode is selected. If residuals mode is selected the residuals ranking step may be performed (i.e. a residuals ranking operation may be performed on the first step of residuals to generate a ranked set of residuals). The ranked set of residuals may be filtered so that not all residuals are encoded into the first enhancement stream 316 (or correction stream).

The first set of residuals, or the ranked or filtered first set of residuals are then transformed 336, quantized 338 and entropy encoded 340 to produce the encoded Level 1 stream 316 (i.e. a transform operation 336 is applied to the first set of residuals or the filtered first set of residuals depending on whether or not ranking mode is selected to generate a transformed set of residuals; a quantization operation 338 is applied to the transformed set of residuals to generate a set of quantized residuals; and, an entropy encoding operation 340 is applied to the quantized set of residuals to generate the first level of enhancement stream 316). Preferably, the entropy encoding operation 340 may be a Huffman encoding operation or a run-length encoding operation or both. Optionally a control operation (not shown in the Figures) may be applied to the quantized set of residuals so as to correct for the effects of the ranking operation.

As noted above, the enhancement stream may comprise a first level of enhancement 316 and a second level of enhancement 328. The first level of enhancement 316 may be considered to be a corrected stream. The second level of enhancement 328 may be considered to be a further level of enhancement that converts the corrected stream to the original input video.

The further level of enhancement 328 is created by encoding a further set of residuals which are the difference 324 between an up-sampled version of a decoded level 1 stream and the input video 302.

In FIG. 3, the quantized (or controlled) set of residuals are inversely quantized 342 and inversely transformed 344 before a de-blocking filter (not shown in the Figures) is optionally applied to generate a decoded first set of residuals (i.e. an inverse quantization operation 342 is applied to the quantized first set of residuals to generate a de-quantized first set of residuals; an inverse transform operation 344 is applied to the de-quantized first set of residuals to generate a de-transformed first set of residuals; and, a de-blocking filter operation is optionally applied to the de-transformed first set of residuals to generate a decoded first set of residuals). The de-blocking filter step is optional depending on the transform 336 applied and comprises applying a weighted mask to each block of the de-transformed 344 first set of residuals.

The decoded base stream is combined 320 with the decoded first set of residuals (i.e. a summing operation 320 is performed on the decoded base stream and the decoded first set of residuals to generate a re-created first stream). As illustrated in FIGS. 3A and 3B, that combination is then up-sampled 322 (i.e. an up-sampling operation 322 is applied to the re-created first stream to generate an up-sampled re-created stream).

The up-sampled stream is then compared to the input video 302 which creates a further set of residuals (i.e. a difference operation 324 is applied to the up-sampled re-created stream to generate a further set of residuals). The further set of residuals are then encoded as the encoded Level 2 enhancement stream 328 (i.e. an encoding operation is then applied to the further set of residuals to generate an encoded further enhancement stream 328).

As with the encoded Level 1 stream 316, the encoding applied to the level 2 residuals may comprise several steps. FIG. 3A illustrates the steps as temporal prediction (described further below), transform 348, quantization 350 and entropy encoding 352.

Although not shown in the Figures, in some examples, the encoding process identifies if the residuals ranking mode is selected. If residuals mode is selected the residuals ranking step may be performed (i.e. a residuals ranking operation may be performed on the further set of residuals to generate a further ranked set of residuals). The further ranked set of residuals may be filtered so that not all residuals are encoded into the further enhancement stream 328.

The further set of residuals or the further ranked set of residuals are subsequently transformed 348 (i.e. a transform operation 348 is performed on the further ranked set of residuals to generate a further transformed set of residuals). As illustrated, the transform operation 348 may utilise a predicted coefficient or predicted average derived from the re-created first stream, prior to up-sampling 322. Further information is below.

FIG. 3A shows a variation of the second example encoder 300 where temporal prediction is performed as part of the level 2 encoding process. Temporal prediction is performed using the temporal selection component 334 and the level 2 temporal buffer 332. The temporal selection component 334 may determine a temporal processing mode as described in more detail below and control the use of the level 2 temporal buffer 332 accordingly. For example, if no temporal processing is to be performed the temporal selection component 334 may indicate that the contents of the level 2 temporal buffer 332 are to be set to 0. FIG. 3B shows a variation of the second example encoder 380 where temporal prediction is performed as part of both the level 1 and the level 2 encoding process. In FIG. 3B, a level 1 temporal buffer 330 is provided in addition to the level 2 temporal buffer 332. Although not shown, further variations where temporal processing is performed at level 1 but not level 2 are also possible.

When temporal prediction is selected, the second example encoder 300, 380 of FIG. 3A or 3B may further modify the coefficients (i.e. the transformed residuals output by a transform component) by subtracting a corresponding set of coefficients derived from an appropriate temporal buffer. The corresponding set of coefficients may comprise a set of coefficients for a same spatial area (e.g. a same coding unit as located within a frame) that are derived from a previous frame (e.g. coefficients for the same area for a previous frame). These coefficients may be derived or otherwise obtained from a temporal buffer. Coefficients obtained from a temporal buffer may be referred to herein as temporal coefficients. The subtraction may be applied by a subtraction component such as the third subtraction components 354 and 356 (for respective levels 2 and 1). This temporal prediction step will be further described with respect to later examples. In summary, when temporal prediction is applied, the encoded coefficients correspond to a difference between the frame and an other frame of the stream. The other frame may be an earlier or later frame (or block in the frame) in the stream. Thus, instead of encoding the residuals between the up-sampled re-created stream and the input video, the encoding process may encode the difference between a transformed frame in the stream and the transformed residuals of the frame. Thus, the entropy may be reduced. Temporal prediction may be applied selectively for groups of coding units (referred to herein as "tiles") based on control information and the application of temporal prediction at a decoder may be applied by sending additional control information along with the encoded streams (e.g. within headers).

As shown in FIGS. 3A and 3B, when temporal prediction is active, each transformed coefficient may be:

$$\Delta = F_{current} - F_{buffer}$$

where the temporal buffer may store data associated with a previous frame. Temporal prediction may be performed for one colour plane or for multiple colour planes. In general, the subtraction may be applied as an element wise subtraction for a "frame" of video where the elements of the frame represent transformed coefficients, where the transform is applied with respect to a particular n by n coding unit size (e.g. 2×2 or 4×4). The difference that results from the temporal prediction (e.g. the delta above) may be stored in the buffer for use for a subsequent frame. Hence, in effect, the residual that results to the temporal prediction is a coefficient residual with respect to the buffer. Although FIGS. 3A and 3B show temporal prediction being performed after the transform operation, it may also be performed after the quantize operation. This may avoid the need to apply the level 2 inverse quantization component 358 and/or the level 1 inverse quantize component 360. Thus, as illustrated in FIGS. 3A and 3B and described above, the output of the second example encoders 300, 380 after performing an encoding process is an encoded base stream 310 and one or more enhancement streams which preferably comprise an encoded level 1 stream 316 for a first level of enhancement and an encoded level 2 stream 328 for a further or second level of enhancement.

Figure 4A:
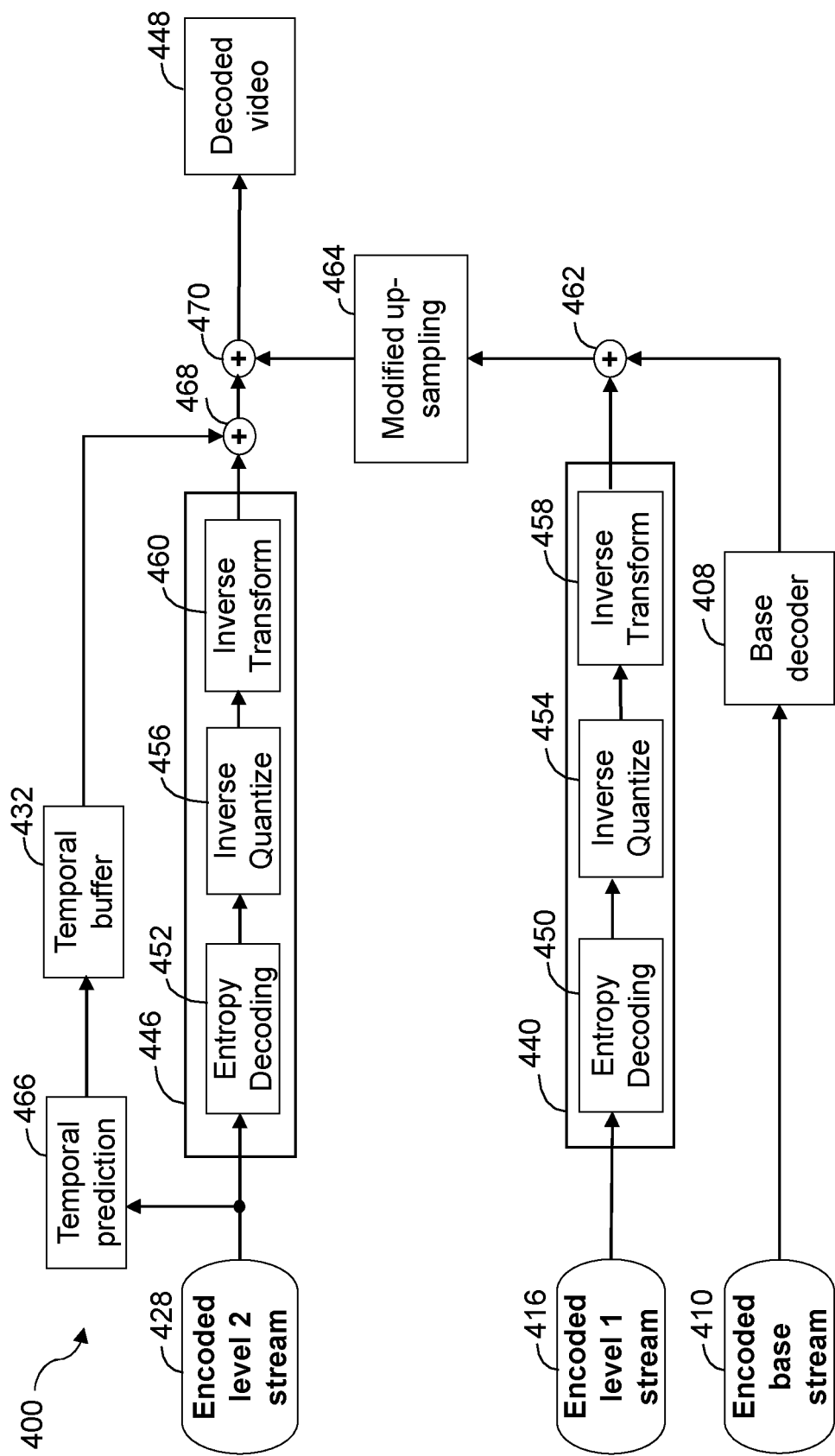
FIGS. 4A and 4B are schematic diagrams each illustrating a decoding process according to examples herein.
Figure 4B:
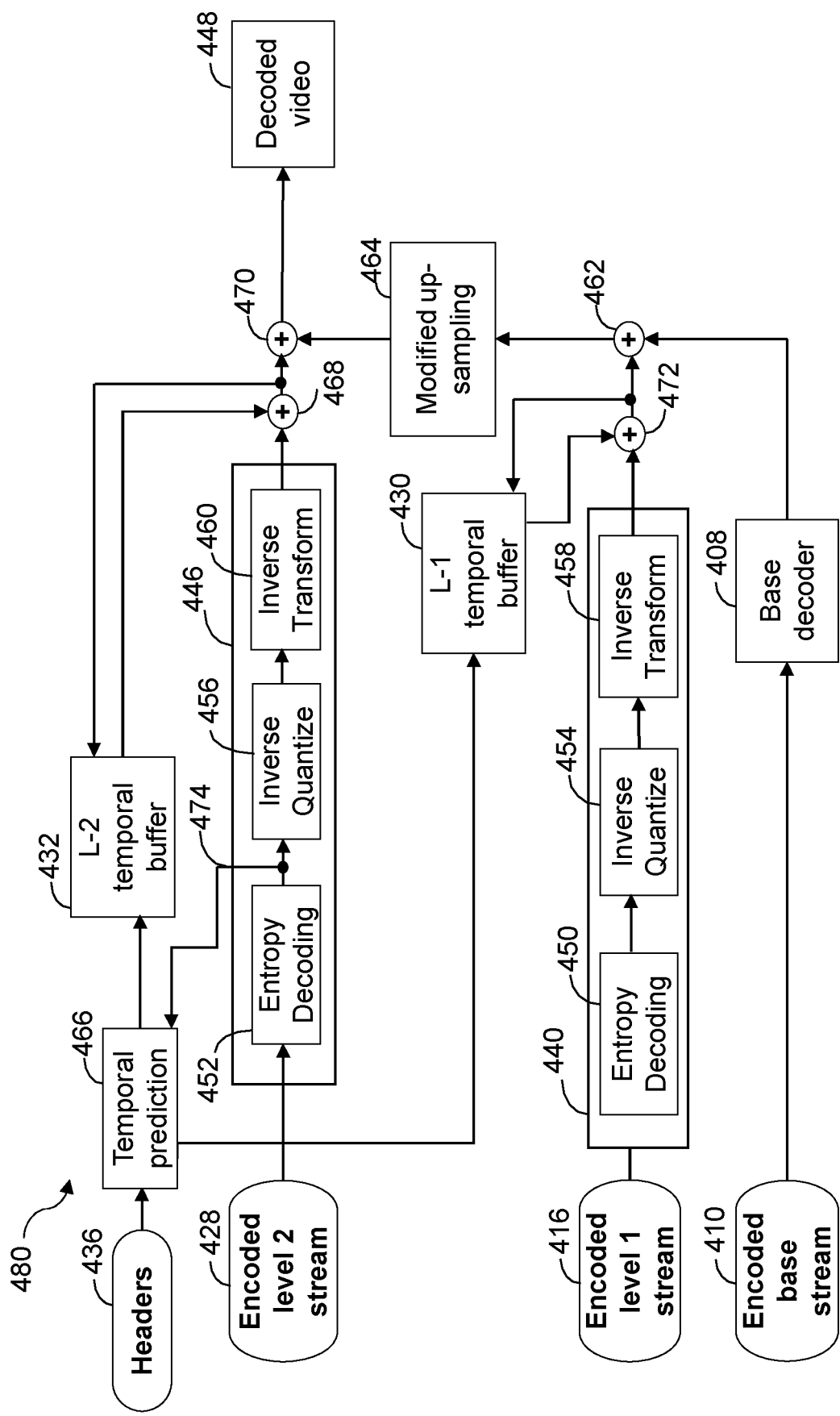

FIGS. 4A and 4B illustrate respective variations of a second example decoder 400, 480. The variations of the second example decoder 400, 480 may be respectively implemented to correspond to the first example decoder 200 of FIG. 2. As is clearly identifiable, the decoding steps and components are expanded in more detail to provide an example of how the decoding may be performed. As with FIGS. 3A and 3B, FIG. 4A illustrates a variation where temporal prediction is used only for the second level (i.e. level 2) and FIG. 4B illustrates a variation in which temporal prediction is used in both levels (i.e. levels 1 and 2). As before, further variations are envisaged (e.g. level 1 but not level 2), where the form of the configuration may be controlled using signalling information.

As shown in the example of FIG. 4B, in the decoding process, the decoder 480 may parse the headers 436 (e.g. containing global configuration data, picture configuration data, and other data blocks) and configure the decoder based on those headers 436. In order to re-create the input video, the decoder 400, 480 may decode each of the base stream 410, the first enhancement stream 416 and the further enhancement stream 428. The frames of the stream may be synchronised and then combined to derive the decoded video 448.

In each decoding process, the enhancement streams may undergo the steps of entropy decoding 450, 452, inverse quantization 454, 456 and inverse transform 458, 460 to re-create a set of residuals.

The decoding processes of FIGS. 4A and 4B comprise retrieving an array of entropy decoded quantized coefficients representing a first level of enhancement and outputting an array of L−1 residuals. The entropy decoded quantized coefficients in this case are obtained by applying the entropy decoding 450 operation to the encoded L−1 stream 416. The decoding processes of FIGS. 4A and 4B further comprise retrieving an array of samples of output of a base decoder 408. The decoding processes of FIGS. 4A and 4B further comprise applying a de-quantization process 454 to the array of entropy decoded quantized coefficients to derive a set of de-quantized coefficients, applying a transformation process 458 to the set of de-quantized coefficients and optionally applying a filter process (Not shown in FIGS. 4A and 4B) to output the array of L−1 residuals representing a first level of enhancement, which may be referred to as a preliminary set of residuals. In this case, the de-quantization process 454 is applied to entropy decoded quantized coefficients for respective blocks of a frame of the encoded level 1 stream 416, and the transformation process 458 (which may be referred to as an inverse transform operation) is applied to the output of the de-quantization process 454 for the respective blocks of the frame. The decoding processes of FIGS. 4A and 4B then further comprise recreating a picture by combining 462 the array of L−1 residuals with the array of samples of output of the base decoder 408. The decoding processes of FIGS. 4A and 4B comprise applying a transform process 458 from a set of predetermined transform processes according to a signalled parameter. For example, the transform process 458 may be applied on a 2×2 coding unit or a 4×4 coding unit. A coding unit may be referred to herein as a block of elements in an array, in this case the array of L−1 residuals.

The decoding processes of FIGS. 4A and 4B comprise retrieving an array of entropy decoded quantized coefficients representing a further level of enhancement and outputting an array of residuals. In the decoding processes shown in FIGS. 4A and 4B, the further level of enhancement is a second level of enhancement and the array of residuals output is an array of L−2 residuals. The method of FIGS. 4A and 4B further comprises retrieving the array of L−1 residuals of the first level of enhancement corresponding to the array of entropy decoded quantized coefficients representing a further level of enhancement. The method of FIGS. 4A and 4B further comprises applying an up-sampling process 464 to the array of residuals of the first level of enhancement. In FIGS. 4A and 4B, the up-sampling process 464 is applied to the combination of the array of L−1 residuals of the first level of enhancement and the corresponding array of samples of output of the base decoder 408.

In FIGS. 4A and 4B, the up-sampling process 464 is a modified up-sampling process, in which a modifier is added to a residual. The step of adding a modifier may be performed as part of the transform process 460. Alternatively, since the transform process 460 involves a linear transformation, the step of adding a modifier may be performed as part of the modified up-sampling process 464, as shown in FIGS. 4A and 4B. The step of adding a modifier therefore results in a modification of a residual. The modification may be performed based on a location of the residual in a frame. The modification may be a predetermined value.

In FIG. 4A, temporal prediction is applied during the level 2 decoding. In the example of FIG. 4A, the temporal prediction is controlled by a temporal prediction component 466. In this variation, control information for the temporal prediction is extracted from the encoded level 2 stream 428, as indicated by the arrow from the stream to the temporal prediction component 466. In other implementations, such as those shown in FIG. 4B, control information for the temporal prediction may be sent separately from the encoded level 2 stream 428, e.g. in the headers 436. The temporal prediction component 466 controls the use of the level 2 temporal buffer 432, e.g. it may determine a temporal mode and control temporal refresh as described with reference to later examples. The contents of the temporal buffer 432 may be updated based on data for a previous frame of residuals. When the temporal buffer 432 is applied, the contents of the buffer are added 468 to the second set of residuals. In FIG. 4A, the contents of the temporal buffer 432 are added 468 to the output of a level 2 decoding component 446 (which in FIG. 4A implements the entropy decoding 452, the inverse quantization 456 and the inverse transform 460). In other examples, the contents of the temporal buffer may represent any set of intermediate decoding data and as such the addition 468 may be moved appropriately to apply the contents of the temporal buffer at an appropriate stage (e.g. if the temporal buffer is applied at the dequantized coefficient stage, the addition 468 may be located before the inverse transform 460). The temporal-corrected second set of residuals are then combined 470 with the output of the up-sampling 464 to generate the decoded video 448. The decoded video 448 is at a level 2 spatial resolution, which may be higher than a level 1 spatial resolution. The second set of residuals apply a correction to the (viewable) upsampled reconstructed video, where the correction adds back in fine detail and improves the sharpness of lines and features.

The transform processes 458, 460 may be selected from a set of predetermined transform processes according to a signalled parameter. For example, the transform process 460 may be applied on a 2×2 block of elements in the array of L−2 residuals or a 4×4 block of elements in the array of L−2 residuals.

FIG. 4B shows a variation of the second example decoder 480. In this case, temporal prediction control data is received by a temporal prediction component 466 from headers 436. The temporal prediction component 466 controls both the level 1 and level 2 temporal prediction, but in other examples separate control components may be provided for both levels if desired. FIG. 4B shows how the reconstructed second set of residuals that are added 468 to the output of the level 2 decoding component 446 may be fed back to be stored in the level 2 temporal buffer 432 for a next frame (the feedback is omitted from FIG. 4A for clarity). A level 1 temporal buffer 430 is also shown that operates in a similar manner to the level 2 temporal buffer 432 described above and the feedback loop for the buffer is shown in this Figure. The contents of the level 1 temporal buffer 430 are added into the level 1 residual processing pipeline via a summation 472. Again, the position of this summation 472 may vary along the level 1 residual processing pipeline depending on where the temporal prediction is applied (e.g. if it is applied in transformed coefficient space, it may be located before the level 1 inverse transform component 458).

FIG. 4B shows two ways in which temporal control information may be signalled to the decoder. A first way is via headers 436 as described above. A second way, which may be used as an alternative or additional signalling pathway is via data encoded within the residuals themselves. FIG. 4B shows a case whereby data 474 may be encoded into an HH transformed coefficient and so may be extracted following entropy decoding 452. This data 474 may be extracted from the level 2 residual processing pipeline and passed to the temporal prediction component 466.

Each enhancement stream or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Each frame may be composed of three different planes representing a different colour component, e.g. each component of a three-channel YUV video may have a different plane. Each plane may then have residual data that relates to a given level of enhancement, e.g. a Y plane may have a set of level 1 residual data and a set of level 2 residual data. In certain cases, e.g. for monochrome signals, there may only be one plane; in which case, the terms frame and plane may be used interchangeably. The level-1 residuals data and the level-2 residuals data may be partitioned as follows. Residuals data is divided into blocks whose size depends on the size of the transform used. The blocks are for example a 2×2 block of elements if a 2×2 directional decomposition transform is used or a 4×4 block of elements if a 4×4 directional decomposition transform is used. A tile is a group of blocks that cover a region of a frame (e.g. a M by N region, which may be a square region). A tile is for example a 32×32 tile of elements. As such, each frame in an encoded stream may be divided into a plurality of tiles, and each tile of the plurality of tiles may be divided into a plurality of blocks. For colour video, each frame may be partitioned into a plurality of planes, where each plane is divided into a plurality of tiles, and each tile of the plurality of tiles is divided into a plurality of blocks.

It was noted above how a set of processing components or tools may be applied to each of the enhancement streams (or the input video 102, 302) throughout the process. The following provides a summary each of the tools and their functionality within the overall process as illustrated in FIGS. 1 to 4.

The down-sampling process 104, 304 is applied to the input video 102, 302 to produce a down-sampled video to be encoded by a base encoder 106, 306. The down-sampling 104, 304 can be done either in both vertical and horizontal directions, or alternatively only in the horizontal direction.

The input to the L-1 encoding operation 114 comprises the L-1 residuals obtained by taking the difference 112, 312 between the decoded output of the base decoder 108, 308 and the down-sampled video obtained by down-sampling 104, 304 the input video 102, 302. The L-1 residuals are then transformed 336, quantized 338 and encoded 340 as further described below. The transform 336 outputs transform coefficients (i.e. transformed L-1 residuals).

There are two types of transforms that could be used in the transformation process 336. Both leverage small kernels which are applied directly to the residuals that remain after the stage of applying the predicted average.

A first transform has a 2×2 kernel which is applied to a 2×2 block of residuals. The resulting coefficients are as follows:

$$\begin{pmatrix} C_{00} \\ C_{01} \\ C_{10} \\ C_{11} \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} R_{00} \\ R_{01} \\ R_{10} \\ R_{11} \end{pmatrix}$$

A second transform has a 4×4 kernel which is applied to a 4×4 block of residuals. The resulting coefficients are as follows:

$$\begin{pmatrix} C_{00} \\ C_{01} \\ C_{02} \\ C_{03} \\ C_{10} \\ C_{11} \\ C_{12} \\ C_{13} \\ C_{20} \\ C_{21} \\ C_{22} \\ C_{23} \\ C_{30} \\ C_{31} \\ C_{32} \\ C_{33} \end{pmatrix} = \begin{pmatrix} 1 & 1 & 1 & 1 & 1 & 1 & 1 & 1 & 1 & 1 & 1 & 1 & 1 & 1 & 1 & 1 \\ 1 & 1 & -1 & -1 & 1 & 1 & -1 & -1 & 1 & 1 & -1 & -1 & 1 & 1 & -1 & -1 \\ 1 & -1 & 1 & -1 & 1 & -1 & 1 & -1 & 1 & -1 & 1 & -1 & 1 & -1 & 1 & -1 \\ 1 & -1 & -1 & 1 & -1 & -1 & 1 & -1 & -1 & 1 & -1 & -1 & 1 & -1 & -1 & 1 \\ 1 & 1 & 1 & 1 & 1 & 1 & 1 & 1 & -1 & -1 & -1 & -1 & -1 & -1 & -1 & -1 \\ 1 & 1 & -1 & -1 & 1 & 1 & -1 & -1 & -1 & -1 & 1 & 1 & -1 & -1 & 1 & 1 \\ 1 & -1 & 1 & -1 & 1 & -1 & 1 & -1 & -1 & 1 & -1 & 1 & -1 & 1 & -1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & 1 & 1 & -1 & -1 & -1 & -1 & 1 & 1 \\ 1 & -1 & 1 & -1 & -1 & 1 & -1 & 1 & 1 & -1 & 1 & -1 & -1 & 1 & -1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & 1 & -1 & -1 & -1 & -1 & 1 & 1 & -1 & -1 & 1 & 1 & 1 & 1 & -1 & -1 \\ 1 & -1 & 1 & -1 & -1 & 1 & -1 & 1 & -1 & 1 & -1 & 1 & 1 & -1 & 1 & -1 \\ 1 & -1 & -1 & 1 & -1 & 1 & 1 & -1 & -1 & 1 & 1 & -1 & 1 & -1 & -1 & 1 \end{pmatrix} \begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix}$$

Suitably adapted transformations may also be applied if down- and/or up-sampling is performed in a horizontal direction only (e.g. with certain elements set to 0). If the Hadamard transformation is used, e.g. as illustrated in the example matrices above, then a decoding or inverse transformation may use the same matrix, e.g. Hadamard matrices are their own inverse. In this case, for example, a (M×N)×1 array of residuals R relating to a M×N block may be derived at the decoder from a corresponding (M×N)×1 array of coefficients C, using R=H*C where H equals one of the Hadamard matrices shown above.

The coefficients are then quantized 338 using a linear quantizer. The linear quantizer may use a dead zone of variable size. The linear quantizer may use a dead zone of different size compared to the quantization step and non-centered dequantization offset.

The quantized coefficients are encoded using an entropy coder 340. There are two schemes of entropy coding 340. In a first scheme, the quantized coefficients are encoded using a Run-Length-Encoder (RLE). In a second scheme, the quantized coefficients are first encoded using RLE, then the encoded output is processed using a Huffman Encoder. This may beneficially encode long streams of 0s, which are typically found with transformed residuals, with the RLE, and then further beneficially encode different frequencies of quantized values (e.g. that often have a reduced number as the value increases due to the distributions of the residuals and their linearly transformed values) using the Huffman encoder.

If residual mode (RM) has been selected, the L−1 residuals are further ranked and selected in order to determine which residuals should be transformed 336 and encoded. Preferably this is preformed prior to entropy encoding 340.

If the temporal selection mode is selected for the L−1 encoding, the encoder will further modify the coefficients by subtracting the corresponding coefficients derived from a level 1 temporal buffer 130, 330, i.e. temporal prediction described below.

The input to the L−1 decoding operation 118 comprises the L−1 encoded residuals, which are passed through an entropy decoder 450, a de-quantizer 454 and an inverse transform module 458. The operations performed by these modules are the inverse operations performed by the modules described above.

If the temporal selection mode has been selected for the L−1 encoding, the residuals may be in part predicted from co-located residuals from a level 1 temporal buffer 130, 330. The co-located residuals may be referred to herein as temporal predictions.

If a 4×4 transform is used, the decoded residuals may be fed to a deblocking filter module. The deblocking filter operates on each block of transformed residuals by applying a mask whose weights can be specified. The general structure of the mask is as follows:

$$\begin{matrix} \alpha & \beta & \beta & \alpha \\ \beta & 1 & 1 & \beta \\ \beta & 1 & 1 & \beta \\ \alpha & \beta & \beta & \alpha \end{matrix}$$

where $0 \leq \alpha \leq 1$ and $0 \leq \beta \leq 1$.

The output from combining 120, 320 the decoded (and deblocked, if applicable) L−1 residuals and base decoded video is up-sampled 122, 322 in order to generate an up-sampled reconstructed video. The upsampling may be selectable and signalled in the bytestream.

The input to the L−2 encoding operation 126 comprises the L−2 residuals obtained by taking the difference 124, 324 between the up-sampled reconstructed video and the input video 102, 302. The L−2 residuals are then transformed 348, quantized 350 and encoded 352 as further described below. The transform 348, quantization 350 and encoding 352 are performed in the same manner as described in relation to L−1 encoding 114. As explained with reference to the L−1 encoding 114, the transform 348 outputs transform coefficients (i.e. transformed L−2 residuals). If RM has been selected, the L−2 residuals are further ranked and selected in order to determine which residuals should be transformed and encoded. The L−2 encoding operation 126 may further comprise two additional processes as described below.

If the predicted coefficient mode is selected, the encoder will further modify the transformed coefficient C00 (e.g. an "Average" or "A" coefficient for a 2×2 transform). If the 2×2 transform is used, C00 will be modified by subtracting the value of the up-sampled residual which the transformed block of residuals is predicted from. If the 4×4 transform is used, C00 will be modified by subtracting the average value of the four up-sampled residuals which the transformed block of residuals is predicted from.

If the temporal selection mode is selected for the L−2 encoding, the encoder will further modify the coefficients by subtracting the corresponding coefficients derived from a level 2 temporal buffer 132, 332, as described above.

The input to the L−2 decoding operation 246, 446 comprises the encoded L−2 residuals. The decoding process of the L−2 residuals are passed through an entropy decoder 452, a de-quantizer 456 and an inverse transform module 460. The operations performed by these modules are the inverse operations performed by the modules described above. If the temporal selection mode has been selected for the L−2 encoding, the residuals may be in part predicted from co-located residuals from a level 2 temporal buffer 132, 332. The co-located residuals may be referred to herein as temporal predictions.

The modified up-sampling process 242,464 comprises two steps, the second depending on a signalling received by the decoder. In a first step, the combination 238, 462 of the decoded (and deblocked, if applicable) L−1 residuals and base decoded video 208, 408 (L−1 reconstructed video) is up-sampled to generate an up-sampled reconstructed video. If the predicted coefficient mode has been selected, then a second step is implemented. In particular, the value of the element in the L−1 reconstructed value from which a 2×2 block in the up-sampled reconstructed video was derived is added to said 2×2 block in the up-sampled reconstructed video.

Throughout the above, the term bitstream may be replaced by stream or bytestream or NALU stream as appropriate.

With reference to FIGS. 4A and 4B, the following example relates to a temporal prediction process applied during the level 2 decoding. However, it is to be appreciated that the following temporal prediction process may additionally or alternatively be applied during the level 1 decoding.

In this example, the decoder 400, 480 is configured to receive a temporal_enabled parameter which specifies whether temporal prediction should be used when decoding a picture. The temporal_enabled parameter may be referred to herein as a first parameter with a first value that indicates temporal processing is enabled. In this case, the temporal_enabled parameter indicates whether the decoder 400, 480 is to refresh the values of temporal predictions derived from the contents of the temporal buffer 432. The value of the temporal_enabled parameter may have a bit length of one bit. In this example, a value of 1 specifies that temporal prediction will be used when decoding a picture and a value of 0 specifies that temporal prediction will not be used when decoding a picture. The temporal_enabled parameter may be received once for a group of pictures associated with the encoded streams discussed above, the group of pictures being a collection of successive pictures within a coded video stream.

In this example, the decoder 400, 480 is configured to receive a temporal_refresh_bit parameter which specifies whether the temporal buffer 432 should be refreshed for the frame. If a frame comprises multiple planes, the refresh may be applied for all planes in the frame (i.e. for the frame that comprises the planes). Refreshing the temporal buffer 432 may include setting the values from the temporal buffer 432 to zero. In this way, when the contents of the temporal buffer 432 are added 468 to the second set of residuals, the second set of residuals will be unchanged in the same way as if the temporal buffer 432 was not applied. The value of the temporal_refresh_bit parameter may have a bit length of one bit. In this example, a value of 1 specifies that the temporal buffer 432 is to be refreshed for the frame and a value of 0 indicates that the temporal buffer 432 is not to be refreshed for the frame. The temporal_refresh_bit parameter may be received once for each picture in the coded video stream. The temporal_enabled and temporal_refresh_bit parameters may be comprised in the temporal control information signalled to the decoder, e.g. via headers 436 as described above.

In this example, if the variable temporal_enabled is equal to 1 and temporal_refresh_bit is equal to 0, the temporal prediction process is invoked as specified below.

Inputs to the invoked temporal prediction process are:
- a location (xTbP, yTbP) specifying the top-left sample of the current luma or chroma transform block relative to the top-left luma or chroma sample of the current picture. (xTbP, yTbP) can be related to either luma or chroma plane depending on which plane the transform coefficients belong to.
- a parameter nTbS specifying the size of the current transform block. For example, nTbS is equal to 2 when a 2×2 directional decomposition transform is to be used in the transform process described above and nTbS is equal to 4 when a 4×4 directional decomposition transform process is to be used.
- a parameter temporal_tile_intra_signalling_enabled which specifies whether temporal tile prediction should be used when decoding a tile of elements. The parameter temporal_tile_intra_signalling_enabled may be referred to herein as a third parameter with a third value. The value of the temporal_tile_intra_signalling_enabled parameter may have a bit length of one bit. In this example, if the value of the temporal_tile_intra_signalling_enabled parameter is equal to 1, the tile temporal prediction process will be enabled. The temporal_tile_intra_signalling_enabled parameter may be received once for a group of pictures associated with the encoded streams discussed above. The temporal_tile_intra_signalling_enabled parameter may be comprised in the temporal control information signalled to the decoder, e.g. via headers 436. This parameter may indicate whether temporal signalling that relates to a tile may be provided, where the signalling is encapsulated within the coefficient values as described below (i.e. is "intra" or within the data). If this parameter is set to 1, then the first block in a tile may carry the temporal refresh signalling for the tile (e.g. via a coefficient value within the first block).
- an array TransCoeffQ of size (nTbS)×(nTbS) containing a block of entropy decoded quantized coefficients with elements TransCoeffQ [x][y].

Outputs to this process are the (nTbS)×(nTbS) array of the modified TransCoeffQ coefficients and the (nTbS)×(nTbS) array tempPredSamples with elements tempPredSamples[x][y]. The array of the tempPredSamples represents a set of temporal predictions derived using the temporal buffer 432.

In this example, the following ordered steps apply:
1. If the parameter temporal_tile_intra_signalling_enabled is equal to 1, the temporal tile prediction process will be used when decoding a tile of elements. In the temporal tile prediction process, if xTbP>>5 is equal to 0, yTbP>>5 is equal to 0 (where "x>>y" is an arithmetic right shift of a two's complement integer representation of x by y binary digits) and TransCoeffQ [nTbs−1][−0]&0x1 is equal to 1 (where "&" represents the bit-wise "and" operator), a tiled temporal refresh process is invoked with the location (xTbP, yTbP) as its input. The right shift allows skipping over elements for consecutive tiles, e.g. a tile of 32×32 has a length and width of $2^5$, in this case a shift by 5 bits that is equal to zero indicates that the current location is a multiple of 32 and so relates to a first block of a tile. In this case then, the first block in a tile is used to signal the tile temporal refresh. The output of the tiled temporal refresh process is that the contents of temporalBuffer for the tile at the location (xTbP, yTbP) are set to zero. In this example, temporalBuffer represents the temporal buffer 432 which stores data associated with a second frame that is not the current frame from which the values of the temporal predictions can be derived. As such the second frame may be an earlier or later frame in the stream. TransCoeffQ [nTbS−1][0]&0x1 is a parameter for the current transform block with a value indicating whether the values of a set of temporal predictions derived from the temporal buffer 432 for a corresponding block are to be refreshed. In the present case, the parameter is "carried" within the transform coefficient values. The "&" (i.e. logical "and") operation with a bit value of 1 (e.g. 0x1) simply converts any non-zero value into an output bit value of 1 (and any zero value remains zero). In general, the TransCoeffQ [nTbS−1][0]&0x1 parameter may be referred to herein as a second parameter with a second value that provides temporal signalling, which in this case indicates whether the values in the temporal buffer 432 associated with a given tile are to be refreshed. In this case, the parameter is used to indicate a tile refresh; in the example below it is used to indicate a block refresh. The refresh may involve setting the values of the corresponding tile or block to zero. In this example, the value of the TransCoeffQ [nTbS−1][0]&0x1 parameter has a bit length of one bit, and a value of 1 indicates values within the temporal buffer 432 are to be refreshed. In the temporal tile prediction process, the tiled temporal refresh process is performed for a tile of the temporal buffer 432 in response to receiving the parameter TransCoeffQ [nTbS−1][0]&0x1 for a block within the tile. In other words, the decoder is configured to refresh the temporal buffer 432 for the tile in response to receiving the parameter TransCoeffQ [nTbS−1][0]&0x1 (the second parameter) for a specified block within the tile. As such, the refresh of a tile can be signalled by a parameter in a single block within the tile without having to separately signal a refresh for every other block within the tile. In this example, the decoder is therefore configured to refresh the values of the temporal predictions of the tile in response to receiving both the second parameter (TransCoeffQ [nTbS−1][0]&0x1) with a second value that, in the case 2) below, indicates that that the decoder is to refresh the values of the temporal predictions for the block and the third parameter (temporal_tile_intra_signalling_enabled) with a third value indicating that receiving the second parameter for the specified block with the second value indicates that the values in the temporal buffer 432 associated with the tile are to be refreshed. The parameter TransCoeffQ [nTbS−1][0]&0x1 is an example of temporal control information that may be signalled to the decoder via data encoded within the encoded residuals themselves such that this temporal control information may be extracted following entropy decoding 452. For example, this parameter (the second parameter) may be obtained from one of the set of coefficients for the block.

2. In the case where the temporal tile prediction process does not occur, if TransCoeffQ [nTbs−1][0]&0x1 is equal to 0, then tempPredSamples[x][y]=temporalBuffer[xTbP+x][yTbP+y] where x and y are in the range [0, nTbS−1] Otherwise, tempPredSamples[x][y] are all set to 0. In this way, for each respective block, the values of the temporal predictions for the respective block derived from the temporal buffer 432 are refreshed in response to obtaining the second parameter (the TransCoeffQ [nTbS−1][0]& 0x1 parameter) from data from the one or more encoded streams (the L−2 encoded stream in this case) for the respective block. In response to determining that the second parameter for the respective block has a second value that provides temporal signalling for the respective block, the values of the temporal coefficients for the respective block are refreshed. In this case, the refresh involves setting the values of the temporal predictions for the respective block to zero. In this case, the refresh of the set of values of the temporal predictions for each block are indicated individually for each block. Otherwise, if TransCoeffQ [nTbS−1][0]&0x1 is equal to 0, the temporal buffer 432 is not refreshed, and the values of the set of temporal predictions for the respective block are derived from the temporal buffer 432 for the respective block.

3. The value of TransCoeffQ [nTbs−1][0] is set to TransCoeffQ [nTbs−1][0]>>1. If TransCoeffQ [nTbs−1][0] has binary values of 0 or 1, this operation sets the transform coefficient value to 0 for subsequent operations (e.g. the later inverse transform). This means that values of 1 that are used for signalling do not translate into image artefacts in the block (a value of 0 for a residual will just equal no change).

The array tempPredSamples of a size (nTbS)×(nTbS) is added to the (nTbS)×(nTbS) array resSamples and resSamples array is stored to the temporalBuffer at the location (xTbP, yTbP). In this example, resSamples represent the second set of residuals and tempPredSamples represents a set of temporal predictions, which as above may be derived from the contents of the temporal buffer 432, e.g. depending on the temporal signalling received at the decoder. In this way, if temporal processing is enabled and this is signalled to be applied at a block level, the contents of the temporal buffer 432 are added 468 to the second set of residuals to generate a temporal-corrected second set of residuals that is then stored to the temporal buffer 432.

In examples herein, a set of temporal predictions derived from the temporal buffer are combined with a set of residuals for each block of a plurality of blocks to perform the temporal prediction. This for example involves obtaining a respective preliminary residual element of a set of preliminary residuals for respective elements of a block and obtaining a respective temporal prediction associated with the element, where the temporal prediction may be set to zero in certain cases, or derived from the contents of the temporal buffer, which may in turn be zeroed by certain temporal signalling that is received at the decoder. The respective preliminary residual elements may then be combined with the temporal predictions for the block to output a reconstructed set of residual values (e.g. level 2 residual values) for combination with the upsampled reconstructed signal from the lower levels (e.g. level 1 and the base level).

In examples described herein, the decoder 400, 480 is configured to provide for zeroing of values of sets of temporal predictions at three levels: at a frame level; at a tile level; and at a block level. For example, the temporal_refresh_bit described above may be used to instruct a refresh of the temporal buffer 432 (e.g. zeroing of the temporal buffer values) at the frame level, where all values in the temporal buffer, e.g. that relate to the complete frame, are set to zero. This may then provide for a zeroing of temporal prediction values, where these values are later derived from the temporal buffer 432. At the block level, temporal signalling that indicates whether temporal prediction values are to be derived from the temporal buffer 432 or set to zero, may be carried within the transform coefficient values (e.g. the value of a coefficient such as HH for a 4×4 transform prior to the inverse transform). At the tile level, a parameter such as temporal_tile_intra_signalling_enabled may be used to indicate that the block level signalling for one block in the tile is to be used to instruct a refresh of the temporal buffer 432 for the tile, i.e. the block level signalling for one block in the tile becomes tile level signalling. When the temporal buffer 432 is refreshed, the values within the temporal buffer are set to 0, which then means that for subsequent blocks in the same tile, the values applied from the temporal buffer will be zero, regardless of the block level signalling.

This approach provides flexibility over refreshing of the temporal buffer 432. For example, the temporal buffer 432 may be refreshed at a frame level for a first frame and at a tile level for at least one tile of a second frame, and temporal predictions may be zeroed at a block level for at least one block of a third frame. At the block level, the zeroing of the temporal predictions may be seen as an equivalent operation to zeroing the temporal buffer 432, both operations result in elements with 0 values being applied at addition 468. For example, the decoder 400, 480 may be configured to refresh the values of the temporal buffer 432 for a first tile of a frame and apply zeroes for temporal predictions for a first block of a second tile of the same frame while applying non-zero values of temporal predictions for a second block of the second tile.

In the decoding process described herein, generating the decoded video may be performed block wise. In this way, generating a block of elements in a frame of the decoded video can be performed without using another block of elements in the same frame of the decoded video that was previously generated. For this reason, the temporal prediction process can be performed in parallel for all blocks of elements in a frame as opposed to sequentially performing the temporal prediction process for each block of elements in the frame.

Further examples are described below.

Some further examples relate to a method of encoding an input video into a plurality of encoded streams, such that the encoded streams may be combined to reconstruct the input video, the method comprising: receiving a full resolution input video; downsampling the full resolution input video to create a downsampled video; encoding the downsampled video using a first codec to create a base encoded stream; reconstructing a video from the encoded video to generate a reconstructed video; comparing the reconstructed video to the input video; and, creating one or more further encoded streams based on the comparison. The input video compared to the reconstructed video may be the downsampled video.

According to an example method, comparing the reconstructed video to the input video comprises: comparing the reconstructed video to the downsampled video to create a first set of residuals and wherein creating the one or more further encoded streams comprises encoding the first set of residuals to create a first level encoded stream.

The input video compared to the reconstructed video may be the full resolution input video and the reconstructed video may be upsampled.

According to an example method, comparing the reconstructed video to the input video comprises: upsampling the reconstructed video to generate an up-sampled reconstructed video; and, comparing the up-sampled reconstructed video to the full resolution input video to create a second set of residuals and wherein creating the one or more further encoded streams comprises encoding the second difference to create a second level encoded stream.

Accordingly, in an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

According to an example method, the step of encoding the first set of residuals comprises: applying a transform to the set of residuals to create a set of coefficients; applying a quantization operation to the coefficients to create a set of quantized coefficients; and, applying an encoding operation to the quantized coefficients.

According to an example method, the step of encoding the second set of residuals comprises: applying a transform to the second set of residuals to create a set of coefficients; applying a quantization operation to the coefficients to create a set of quantized coefficients; and, applying an encoding operation to the quantized coefficients.

The transform for encoding the first and/or second set of residuals may for example be a discrete cosine transform or a wavelet transform. In an alternative example, the transform may be a small transform (e.g.: using a 2×2 kernel or a 4×4 kernel) which decomposes a block of elements into directional components. For example, the 2×2 kernel may be a Hadamard transform. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded. The selection of the transform may be based on an analysis of the data to be transformed.

The first set of residuals and second set of residuals may have different transforms applied to them and the selection may be predetermined or selected during the process. The transform used may be signalled in a header.

The quantization for encoding the first and/or second set of residuals may for example be a linear quantization. The linear quantizer may use a dead zone of variable size. The encoding operation may for example be an entropy encoder and may include run-length encoding and/or Huffman encoding.

Residuals may be a difference between two videos or frames.

The step of encoding the first set of residuals may comprise: ranking the first set of residuals based on a pre-analysis of the first set of residuals; and, selecting a subset of residuals to be transformed and encoded.

In an example, the method comprises analysing the first set of residuals and, based on the analysis, either performing the following steps or not: ranking the first set of residuals; and, selecting a subset of residuals to be transformed and encoded.

In an example, the method comprises analysing the first set of residuals and: ranking the first set of residuals; and, selecting a subset of residuals to be transformed and encoded, such that the steps of ranking and/or selecting are performed differentially based on the analysis.

According to an example method, the step of applying a transform is performed on the selected subset of residuals of the first set of residuals.

The step of encoding the second set of residuals may comprise: ranking the second set of residuals based on a pre-analysis of the second set of residuals; and, selecting a subset of residuals to be transformed and encoded.

In an example, the method comprises analysing the second set of residuals and, based on the analysis, either performing the following steps or not: ranking the second set of residuals; and/or, selecting a subset of residuals to be transformed and encoded.

In an example, the method comprises analysing the second set of residuals and: ranking the second set of residuals; and, selecting a subset of residuals to be transformed and encoded, such that the steps of ranking and/or selecting are performed differentially based on the analysis.

According to an example method, the step of applying a transform is performed on the selected subset of residuals of the second set of residuals.

The encoded streams may be accompanied by one or more headers which include parameters indicating aspects of the encoding process to facilitate decoding. For example, the headers may include the codec used, the transform applied, the quantization applied, and/or other decoding parameters.

In certain examples the step of quantization may comprise adapting the quantization based on an analysis of the coefficients and/or data to be transformed, for example, the residuals data. In certain examples the distribution used in the quantization step may be adapted.

The step of encoding the first set of residuals may comprise: deriving a set of temporal coefficients from a temporal buffer; and, subtracting the set of temporal coefficients from the set of coefficients.

The step of encoding the second set of residuals may comprise: deriving a set of temporal coefficients from a temporal buffer; and, subtracting the set of temporal coefficients from the set of coefficients.

It was described above how a step of ranking and selecting may be applied to the residuals data, a step of subtracting temporal coefficients may be performed and also that quantization may be adapted. Each of these steps may be predetermined and selectively applied or may be applied based on analysis of the input video, downsampled video, reconstructed video, upsampled video or any combination of the above to improve the overall performance of the encoder. The steps may be selectively applied based on a predetermined set of rules or determinatively applied based on the analysis or feedback of the performance.

According to an example method the first codec is a hardware-based codec, preferably the first codec is AVC, HEVC, AV1, VP8, or VP9.

An example method further comprises sending the base encoded stream.

An example method further comprises sending the first level encoded stream.

An example method further comprises sending the second level encoded stream.

Some further examples relate to a method of decoding a plurality of encoded streams into a reconstructed output video, the method comprising: receiving a first base encoded stream; decoding the first base encoded stream according to a first codec to generate a first output video; receiving one or more further encoded streams; decoding the one or more further encoded streams to generate a set of residuals; and, combining the set of residuals with the first video to generate a decoded video.

In an example, the method comprises retrieving a plurality of decoding parameters from a header. The decoding parameters may indicate which procedural steps were included in the encoding process.

In an example the step of decoding the one or more further encoded streams to generate a set of residuals comprises: applying an entropy decoding operation; applying a de-quantization operation; and, applying an inverse transform operation to generate a set of residuals.

In an example, the step of decoding the one or more further encoded streams to generate a set of residuals comprises: predicting a subset of residuals based on co-located residuals from a temporal buffer.

In an example the method may comprise receiving a first level encoded stream and receiving a second level encoded stream. In this example the step of decoding the one or more further encoded streams to generate a set of residuals comprises: decoding the first level encoded stream to derive a first set of residuals; wherein the step of combining the set of residuals with the first video to generate a decoded video, comprises: combining the first set of residuals with the first output video to generate a second output video; upsampling the second output video to generate an up-sampled second output video; decoding the second level encoded stream to derive a second set of residuals; and, combining the second set of residuals with the second output video to generate a reconstructed output video.

In an example, the step of upsampling the second output video to generate an up-sampled second output video comprises: adding a value of an element in the first set of residuals from which a block in the up-sampled second output video was derived to a corresponding block in the up-sampled second output video. The block may be a 2×2 block. This addition step may be selectively performed based on a predetermined value or a signal included in a header.

In an example, the step of decoding the first level encoded stream to derive a first set of residuals, comprises: applying an entropy decoding operation; applying a de-quantization operation; and, applying an inverse transform operation to generate the first set of residuals.

In this example, the step of decoding the first level encoded stream to derive a first set of residuals, comprises: applying a de-blocking filter configured to apply a mask to a block of residuals. The mask may be weighted according to a set of predefined weights.

In an example, the step of decoding the second level encoded stream to derive a second set of residuals, comprises: applying an entropy decoding operation; applying a de-quantization operation; and, applying an inverse transform operation to generate the second set of residuals.

The inverse transform operation may be an inverse operation of the operations defined above or may be a substantially mirrored operation. That is, a 2×2 block or 4×4 block transform may be selectively applied. The transform may be detected by the decoding method or signalled in a header.

If a 2×2 transform is used, coefficients may be modified by adding a value of the residual which the transformed block of residuals is predicted from. If a 4×4 transform is used, coefficients will be modified by adding an average value of the four residuals.

The method may further comprise displaying or outputting the reconstructed output.

In an example, a method of decoding a plurality of encoded streams into a reconstructed output video comprises: receiving an encoded enhancement stream; decoding the encoded enhancement stream to derive a set of residuals, the decoding comprising: obtaining a set of preliminary set of residuals from the encoded enhancement stream; deriving a set of temporal predictions using a temporal buffer; and adding the set of temporal predictions to the set of preliminary residuals to output a processed set of residuals (e.g. level 2 residuals). In this example, the method of decoding the plurality of encoded streams into a reconstructed output video also comprises: receiving a first output video, the first output video comprising an output of a base decoder applied to a base level encoded stream; receiving a further encoded enhancement stream relating to a lower level; decoding the further encoded enhancement stream to derive a further set of residuals combining the further set of residuals with the first output video to generate a second output video; up-sampling the second output video to generate an up-sampled second output video; and combining the processed set of residuals with the up-sampled second output video to generate the reconstructed output video.

In an example, the decoding of the encoded enhancement stream to derive the set of preliminary residuals comprises: applying an entropy decoding operation; applying a de-quantization operation; applying a transform operation to generate the set of preliminary residuals.

In an example, the decoding of the further encoded enhancement stream to derive the further set of residuals comprises: obtaining a further set of preliminary residuals from the further encoded enhancement stream; deriving a further set of temporal predictions using a second temporal buffer; and adding the further set of temporal predictions to the further set of preliminary residuals to output the further set of (level 1) residuals.

In an example, the decoding of the further encoded enhancement stream (i.e. level 1 stream) to derive the further set of residuals (i.e. level 1 residuals) comprises: applying a entropy decoding operation; applying a de-quantization operation; applying a transform operation to generate the further set of residuals. Temporal processing as described in these examples may be applied similarly and selectively to each of the enhancement levels described herein.

Certain examples described herein relate to temporal processing in association with one or more encoded streams. A decoder may be configured to apply temporal processing using a temporal buffer.

The decoder may be configured to decode a plurality of encoded streams into a reconstructed output video. The decoder may be configured to receive a first output video, the first output video comprising an output of a base decoder applied to a base level encoded stream. The decoder may be configured to receive one or more further encoded streams. The decoder may be configured to decode respective frames of the one or more further encoded streams to derive respective sets of residuals.

In some cases, each frame of the respective frames may be divided into a plurality of tiles. Each tile may be divided into a plurality of blocks.

In other cases, each frame of the respective frames may be divided into a plurality of planes. Each plane may be divided into a plurality of tiles. Each tile of the plurality of tiles may be divided into a plurality of blocks.

The decoder may also be configured to combine the sets of residuals with the first output video to generate the reconstructed output video. To decode the respective frames, the decoder may be configured to obtain, for each block of the plurality of blocks, a preliminary set of residuals from the one or more further encoded streams. To decode the respective frames, the decoder may be configured to derive a set of temporal predictions using a temporal buffer. To decode the respective frames, the decoder may be configured to combine the set of temporal predictions with the preliminary set of residuals to output data for combination with the first output video.

The decoder may be configured to provide for selectively zeroing the values of the set of temporal predictions. The decoder may be configured to provide for zeroing of values of the set of temporal predictions at a frame level, for at least one of the respective frames. The decoder may be configured to provide for zeroing of values of the set of temporal predictions at a tile level, for at least one of the plurality of tiles. The decoder may be configured to provide for zeroing of values at a block level, for at least one of the plurality of blocks.

The decoder may be configured to obtain respective residual elements of a block of the plurality of blocks. The decoder may be configured to derive a respective temporal prediction of the set of temporal predictions from the temporal buffer for each of the respective residual elements.

The decoder may be configured to zero the values of the set of temporal predictions by refreshing at least a portion of the temporal buffer. Some further examples relate to an apparatus for encoding a data set into an encoded data set comprising a header and a payload. The apparatus configured to encode an input video according to the above steps. The apparatus may comprise a processor configured to carry out the method of any of the above aspects.

Some further examples relate to an apparatus for decoding a data set into a reconstructed video from a data set comprising a header and a payload. The apparatus configured to decode an output video according to the above steps. The apparatus may comprise a processor configured to carry out the method of any of the above aspects.

An encoder and decoder may also be provided.

Some further examples relate to computer readable media which when executed by a processor cause the processor to perform any of the methods of the above aspects.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed within the scope of the accompanying claims.

The invention claimed is:

1. A decoder configured to decode a plurality of encoded streams into a reconstructed output video, the decoder configured to:
receive an encoded base stream, wherein the encoded base stream is configured to be decoded by a base decoder to produce a first output video;
receive one or more encoded streams;
decode respective frames of the one or more encoded streams to derive respective sets of residuals, each frame of the respective frames being divided into a plurality of tiles and each tile of the plurality of tiles being divided into a plurality of blocks; and
combine the sets of residuals with the first output video to generate the reconstructed output video,
wherein, to decode respective frames, the decoder is configured to:
obtain, for each block of the plurality of blocks, a preliminary set of residuals from the one or more encoded streams;
derive a set of temporal predictions using a temporal buffer; and
combine the set of temporal predictions with the preliminary set of residuals to output data for combination with the first output video;
wherein the decoder is configured to provide for zeroing of values of the set of temporal predictions by being configured to:
receive a first parameter with a first value that indicates temporal processing is enabled;
receive a second parameter at the block level from data from the one or more encoded streams for each respective block of the plurality of blocks, wherein the second parameter has a second value that provides temporal signaling for the respective block and indicates that the decoder is to refresh the values of the temporal predictions for the block;
receive a third parameter at the tile level having a third value which indicates that receiving the second parameter for the specified block with the second value indicates that values in the temporal buffer associated with the tile are to be refreshed; and
refresh the values of the temporal buffer associated with the tile by setting the values of the temporal predictions for the respective tile of the plurality of tiles to zero.

2. The decoder of claim 1, wherein the decoder is configured to generate a first block of elements from a frame in the reconstructed output video without using a second block of elements from the frame in the reconstructed output video.

3. The decoder of claim 1, wherein the decoder is configured to:
obtain respective residual elements of a block of the plurality of blocks; and derive a respective temporal prediction of the set of temporal predictions from the temporal buffer for each of the respective residual elements.

4. The decoder of claim 1, wherein the decoder is further configured to apply an entropy decoding operation to the one or more further encoded streams and to obtain the preliminary set of residuals by applying a de-quantization operation to the respective block, and applying an inverse transform operation to the respective block.

5. The decoder of claim 1, wherein the decoder is configured to zero the values of the set of temporal predictions by refreshing at least a portion of the temporal buffer.

6. The decoder of claim 1, wherein a bit-length of the first value of the first parameter is one bit.

7. The decoder of claim 1, wherein the first parameter is received once for a group of pictures associated with the plurality of encoded streams.

8. The decoder of claim 1, wherein a bit-length of the third value of the third parameter is one bit.

9. The decoder of claim 1, wherein the third parameter is received once for a group of pictures associated with the plurality of encoded streams.

10. The decoder of claim 1, wherein the decoder is configured to refresh values of the temporal buffer for a first tile of a frame of the respective frames and to zero values for the set of temporal predictions for a first block of a second tile of the frame without zeroing the values of the set of temporal predictions for a second block of the second tile.

11. The decoder of claim 1, wherein the decoder comprises an enhancement decoder configured to receive residual data generated from a comparison of data derived from an input video and data derived from the base level encoded stream, wherein the one or more further encoded streams comprise encoded residual data that is decodable to reconstruct one or more further sets of residual data for application to the first output video.

12. The decoder of claim 11, wherein the enhancement decoder is different from the base decoder.

13. The decoder of claim 1, wherein a set of transform coefficients for decoding a set of residuals for a first frame of the one or more further encoded streams represents a difference between the set of transform coefficients for the first frame and a further set of transform coefficients for a second frame of the one or more further encoded streams, different from the first frame.

14. A method of decoding a plurality of encoded streams into a reconstructed output video, the method comprising:
receiving an encoded base stream for decoding by a base decoder and producing a first output video;
receiving one or more encoded streams;
decoding respective frames of the one or more encoded streams to derive respective sets of residuals, each frame of the respective frames being divided into a plurality of tiles and each tile of the plurality of tiles being divided into a plurality of blocks; and
combining the set of residuals with the first output video to generate the reconstructed output video,
wherein the decoding further comprises:
obtaining, for each block of the plurality of blocks, a set of preliminary residuals from the one or more encoded streams;
deriving a set of temporal predictions using a temporal buffer; and
combining the set of temporal predictions with the set of preliminary residuals;
wherein the decoding comprises effecting the zeroing of the values of the set of temporal predictions, and wherein effecting the zeroing of the set of temporal predictions comprises:
receiving a first parameter with a first value that indicates temporal processing is enabled;
receiving a second parameter at the block level from data from the one or more encoded streams for each respective block of the plurality of blocks, wherein the second parameter has a second value that provides temporal signaling for the respective block and indicates that the decoder is to refresh the values of the temporal predictions for the block;
receiving a third parameter at the tile level having a third value which indicates that receiving the second parameter for the specified block with the second value indicates that values in the temporal buffer associated with the tile are to be refreshed; and
refreshing the values of the temporal buffer associated with the tile by setting the values of the temporal predictions for the respective tile of the plurality of tiles to zero.

15. The method of claim 14, comprising generating a first block of elements from a frame in the reconstructed output video without using a second block of elements from the frame in the reconstructed output video.

* * * * *